Dec. 21, 1965    H. J. WYSOCKI    3,225,286
VOLTAGE AND FREQUENCY REGULATOR FOR A MOTOR-GENERATOR INVERTER
Filed March 8, 1962    3 Sheets-Sheet 1

Inventor.
Henry J. Wysocki
By. Hofgren, Brady, Wegner,
Allen & Stellman.
Attorneys.

Dec. 21, 1965     H. J. WYSOCKI     3,225,286
VOLTAGE AND FREQUENCY REGULATOR FOR A MOTOR-GENERATOR INVERTER
Filed March 8, 1962     3 Sheets-Sheet 2
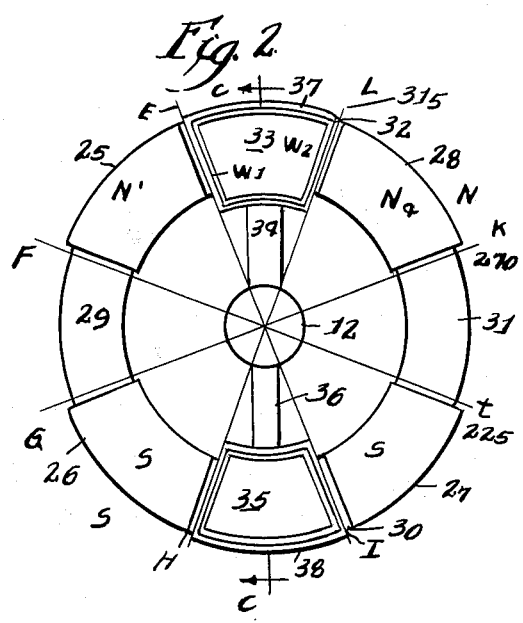
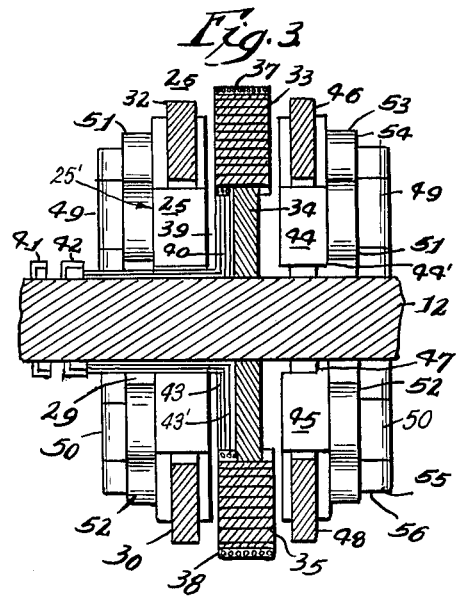
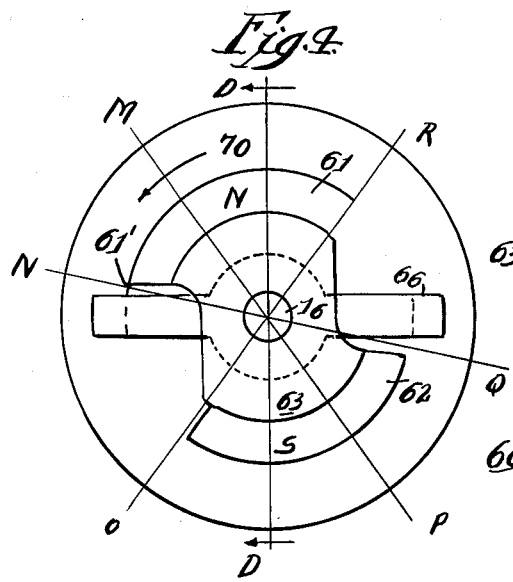
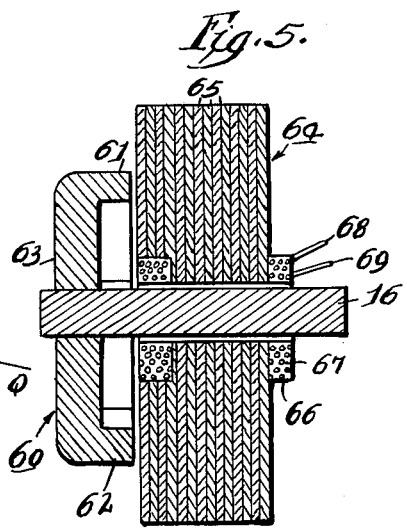

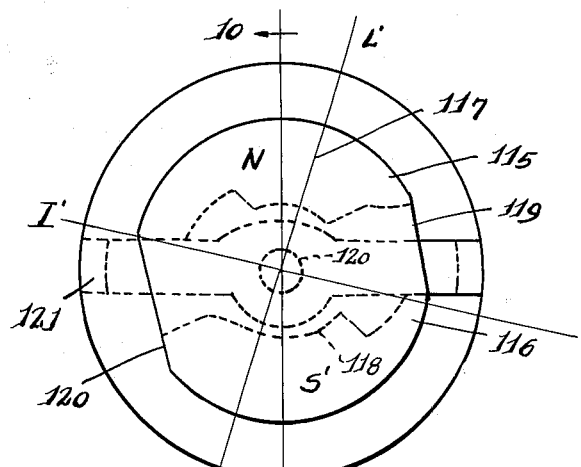
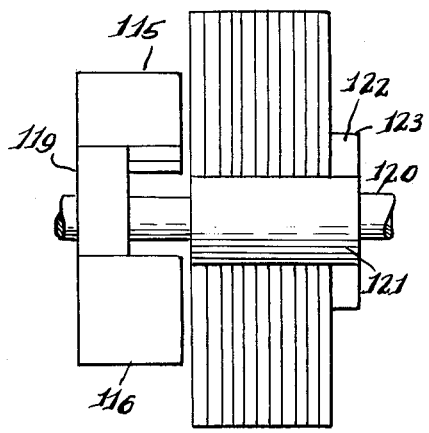
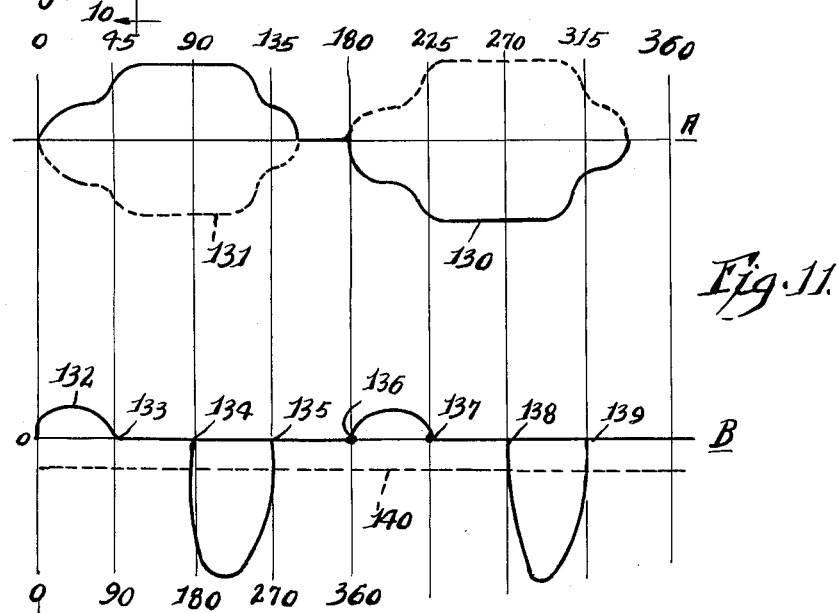
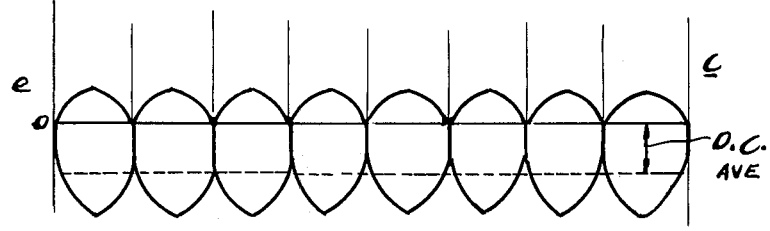

United States Patent Office 3,225,286
Patented Dec. 21, 1965

3,225,286
VOLTAGE AND FREQUENCY REGULATOR FOR A MOTOR-GENERATOR INVERTER
Henry J. Wysocki, 1737 Pennsylvania, Gary, Ind.
Filed Mar. 8, 1962, Ser. No. 178,405
7 Claims. (Cl. 322—61)

This invention relates to an electrical generator and more specifically to a direct current generator.

There are many applications in industry for direct current potentials and many schemes have been devised for producing them efficiently and with a minimum of operating problems.

Among the major problems that have been experienced in designing direct current generators has been that of the commutator. The problems include such items as the maximum potential that can be developed between the commutator bars, the insulation requirements therebetween, the periodic wear and tear upon the commutator bars themselves necessitating periodic machining of the commutator section of the armature and the inherent initial cost of producing such a generator.

To overcome these problems the art has developed various techniques of rectifying alternating current potentials after they have been developed in alternating current generators and producing direct current potentials from such rectifiers.

It is the principal object of this invention to provide a direct current generator of improved design and reduced cost.

It is a further object of this invention to produce a direct current generator which does not require the use of a commutator section.

Accordingly it is one feature of the invention to provide a direct current generator wherein the field producing means for the direct current generator is an alternator synchronized to the rotation of the generator which has a specific configuration. It is a further feature of this invention to provide a direct current generator which develops an alternating current wave that is unbalanced and result in an average wave which has a direct current component.

It is an additional feature of this invention to provide a pair of direct current generators and a pair of field alterations having synchronized rotation for producing a direct current voltage.

Figure 1:
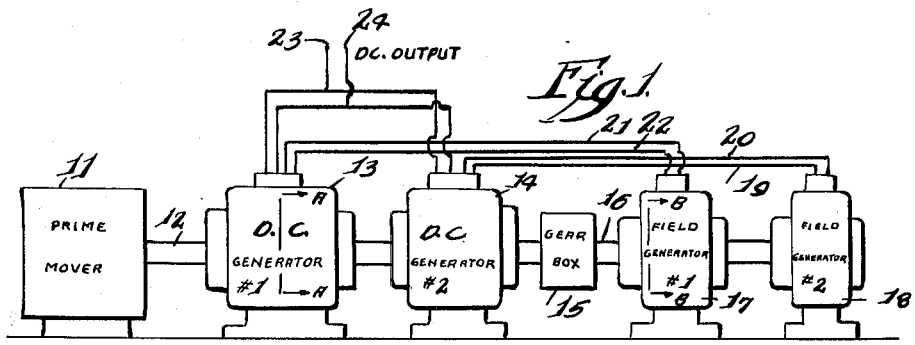
Figure 6:
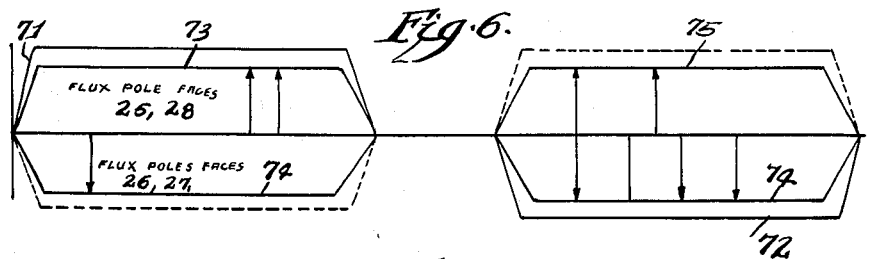
Figure 7:
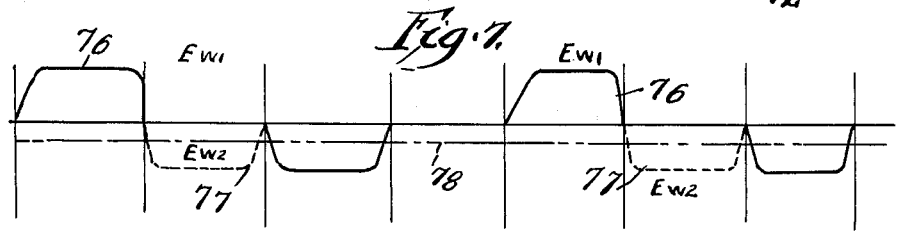
Figure 8:
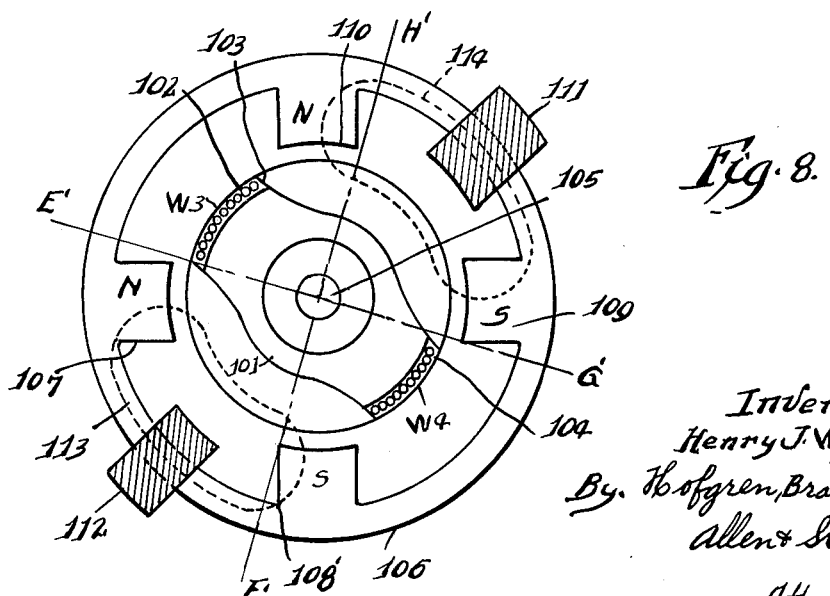

Further features and objects of the invention will become apparent from the specification, the claims and figures wherein:

FIGURE 1 is a schematic diagram of one embodiment of the invention;
FIGURE 2 is a sectional view of one direct current generator taken along lines A—A in FIGURE 1;
FIGURE 3 is a cross-sectional view of the generator shown in FIGURE 2;
FIGURE 4 is a cross sectional view along lines B—B of one of the alternators of FIGURE 1;
FIGURE 5 is a cross-sectional view of the field alternator shown in FIGURE 4;
FIGURE 6 is a curve showing flux densities;
FIGURE 7 is a curve showing voltage wave forms;
FIGURE 8 is a cross-sectional view of a second embodiment of a direct current generator;
FIGURE 9 is an end view of alternator useable with the generator in FIGURE 8;
FIGURE 10 is a cross-sectional view along lines D—D in FIGURE 9; and
FIGURE 11 shows the wave forms produced in the embodiment shown in FIGURES 8, 9 and 10.

FIGURE 1 schematically shows the arrangement of direct current generators and field alternators of one embodiment of the invention. A prime mover 11, shown as a block, may be any type of prime mover such as a diesel engine, a steam driven turbine or other means for rotating a shaft 12. A pair of generators 13 and 14 are shown directly connected to the shaft 12 and an extension thereof is shown going to a gear box 15. From the gear box a shaft 16 is directly connected to a pair of field alternators 17 and 18. The outputs of the alternators 17 and 18 are coupled respectively through leads 19, 20, 21 and 22 to the direct current generators 13 and 14. The outputs of the generators 13, 14 are shown coupled in parallel to a pair of output terminals 23 and 24.

In operation, the armatures of the generators 13 and 14 rotate at the same speed while the armatures of the alternators 17 and 18 rotate at a common speed with a fixed relationship to the rotation of the generators 13 and 14.

The alternators produce field energizing currents for the generators having a predetermined wave form. The generators produce current waves which have an average direct current component. The two outputs are fed in parallel to the output terminal to obtain a desired average current. Although this embodiment shows two such alternator-generator combinations it is to be understood that one generator and one alternator will perform in accordance with the disclosure. It is also possible to couple more than two pairs of alternator generators in parallel if a greater output is needed.

Referring now more specifically to FIGURE 2 which is a sectional view along line A—A of FIGURE 1 and to FIGURE 3 which is a cross-sectional view along lines C—C of FIGURE 2, the construction of one of the direct current generators is shown.

A stator 25' has field magnets 25, 26, 27 and 28 held in a special relationship by non-magnetic spacers 29, 30, 31 and 32. The armature of the generator consists of a first series of laminations 33 joined to a shaft 12 by a spoke 34 and a second series of laminations 35 joined to the shaft 12 by a spoke 36. A first armature coil 37 and a second armature coil 38 are shown encompassing the laminations 33 and 35 respectively. The coils are made of turns of wire and are more clearly shown in FIGURE 3, individually having a pair of teminal wires 39 and 40 coupled to a pair of slip rings 41 and 42. The terminal wires of coil 38 are shown as a pair of wires 43, 43' coupled to the slip rings.

In FIGURE 3 there is a second stator 44' having a pair of additional magnets 44 and 45. It is to be understood that stator 44' has four such magnets arranged in annular form as the magnets 25, 26, 27, 28 held in special relationship about the shaft by a series of spacers three of which are shown as 46, 47 and 48. Both stators, 25', 44' are fixed to the housing (not shown) of the generator. A pair of magnetic yokes 49 and 50 provide magnetic paths between magnet 25 into magnet 44 and magnets 26, 45 respectively. There are similar magnetic yokes coupling magnets 27 and 28 to corresponding magnets on stator 44' which are not shown. In addition a pair of field coils 51, 52 having terminal leads 53, 54 and 55, 56 respectively are wound about the magnetic yokes 49, 50.

The field alternator for the generator is shown in FIGURE 4 which is a sectional view along lines B—B of FIGURE 1 and in FIGURE 5, a cross sectional view along lines D—D of FIGURE 4. The shaft 16 is shown joined to a rotating armature 60 which is composed of a permanent north pole 61 and a permanent south pole 62 coupled together by a magnetic yoke section 63. The stator of the alternator 64 is shown in FIGURE 5 as a series of laminations 65. These provide a magnetic path from the north pole 61 to the south pole 62 and along with section 63 provide a flux circuit. A coil 66 composed of a series of turns 67, has a pair of terminal leads 68 and 69. The coil has a configuration which allows the shaft 16 to pass through it.

The operation of the generator and field alternator may best be understood by referring to FIGURES 6 and 7 which show respectively the potentials developed in the field winding and armature winding of the generator along with the flux density developed in the direct current generator. A series of lines E, F, G, H, I, J, K and L in FIGURE 2 represent the various successive rotational positions taken by the armature of the generator and lines M, N, O, P, Q and R in FIGURE 4 represent various successive rotational positions taken by the leading edge 61′ of magnet 61 of the field alternator in one complete revolution thereof.

Initially, consider the rotation of the armature in FIGURE 4 in the direction of the arrows 70. The north pole 61 begins to pass the windings of coil 66 and a voltage is induced therein. This gives rise to the rising voltage shown in curve 71 of FIGURE 6 once the magnet has completely encompassed all of the windings, the flat portion of the curve of 71 is produced. When the trailing edge of magnet 61 crosses the coil the sloping line of curve 71 is produced at its trailing edge. The field voltage generated is shown in a positive direction in curve 71 and when the magnet 61 commences to cross the coil 66, when it is in the position indicated by line Q, a negative voltage is generated shown as curve 72 in FIGURE 6. Terminals 68 and 69 of the alternator are connected to terminals 53, 54 and 55, 56 of the field windings of the generator and a flux is established between pole faces 25 and 44 as shown by curve 73 and 74 in FIGURE 6. In FIGURE 3, a similar flux is established from pole face 28 to a corresponding pole face (not shown) and connections (not shown) establish a flux for pole faces 26 and 27 with the corresponding pole faces as represented by curve 74 and 75.

Thus, the conductors on coil 37 shown as W1 in position E, when magnet 61 is in position M, begin to cut a flux which produces a voltage in the wires W1 corresponding to the curve 76 of FIGURE 7. While wires W1 travel from position E to position F, a voltage is generated therein as shown by curve 76. When the wires W1 travel from position F to G no voltage is generated and the curve 76 reduces to 0. As the wires reach the position G they begin to cut a flux field which has an opposite direction to that cut going from positions E to F and a negative pulse of voltage is generated between positions G and H. From positions H to I no voltage is generated in this group of wires.

The wires W2 of coil 37 initially in traveling from position L to position E have no voltage generated therein, when the wires travel from position E to F a voltage is generated therein in opposition to the direction of voltage generated in wires W1 and a negative pulse of voltage is developed shown as curve 77 of FIGURE 7. At the time that wires W2 are entering the position indicated by line G magnet 61 has its trailing edge crossing the coil 66 of the field generator and no voltage is generated in wire W2 while it passes between the magnets 26 and 45. Thus the non-symmetrical wave is generated in the coil 37 with a resulting average D.C. potential developed as indicated by the dashed line 78 of FIGURE 7. On the second half of the cycle of rotation of the armatures similar voltages are developed since at that time the magnets 25, 26, 27, 28 of FIGURE 2 reverse their direction of flux due to the fact that south pole 62 of the field alternator is now in position N of FIGURE 4.

A second embodiment of the invention is shown in FIGURES 8, 9, 10 and 11.

The direct current generator in this case consists of an armature 101 having a coil 102 mounted thereon. The coil extends in slots 103 and 104 substantially parallel to the axis of a shaft 105 and is wound about the armature. A pair of terminal wires (not shown) bring the voltage generated therein out to a pair of slip rings (also not shown).

The stator 106 is of substantially annular structure and has 4 pole faces 107, 108, 109 and 110 extending inwardly towards armature 101. A pair of field coils 111 and 112 are wound about sections of the stator and when energized establish flux paths through pairs of the pole faces. The flux paths are indicated by the dashed lines 113, 114. For the ease of discription, armature coil 102 has been divided into two sections of wire noted as W3 and W4.

The field alternator as shown in FIGURES 9 and 10 is substantially the same as that shown in FIGURES 4 and 5 with the exception that the permanent pole faces 115, 116 have portions thereof 117 and 118 of greater cross-sectional area than the balance of the pole face. The purpose of this non-uniformity is to provide an increase in flux density in the stator of the field alternator immediately adjacent the larger sections of the pole faces. The two pole pieces are joned by a yoke 119 which is in turn driven by a shaft 120.

A stator field coil 121 as shown in FIGURES 9 and 10 has a pair of terminal connections 122 and 123 which are provided to couple coil 121 to the field coils 111, 112 at the generator (these connections are not shown). The lines E′, F′, G′ and H′ of FIGURE 8 and I′, J′, K′ and L′ of FIGURE 9 represent degrees of rotation of the generator and the field alternator armatures.

In operation armature 101 rotates at the speed of armature 119 and they maintain their rotational positions relative to each other. FIGURE 11, represents the flux density established between poles 107, 108, 109, 110 and armature 101 by the field coils 112, 111, when energized by the field alternator. The flux density between poles 107, 110 and the armature 101 is represented by the curve 130 and that of poles 108, 109 and armature 101 by curve 131. The positive direction in curve A represents a pole which is substantially north and the area below the line a pole which is substantially a south pole.

As the wires W3 enter into the flux established by pole 107 a voltage is established in the coil 103. At the same time wires W4 are coming under the influence of pole 109 and the current established therein aids the current established in the wires W3 with the resulting voltage curve is as shown in FIGURE 11, curve 132. After the wires W3 and W4 leave the influence of poles 107, 109 there is a period of time during which no voltage is generated in the armature coil 103 which is represented by the zero portion of the curve 132 between points 133, 134. The wires W3 then come under the influence of the flux established by pole 108 while wires W4 are under the influence of pole 110, since there is a reversal of the direction of the flux acting on the wires W3, W4, a negative pulse is developed in the armature coil which is greater than the initial pulse. This is due to the fact that they are under the influence of stronger magnetic fields. This pulse is represented between the points 134, 135 of curve 132. There is again a period of no voltage being generated in the wires W3, W4 due to their rotating through an area of zero flux and this is represented between the points 135, 136 of curve 132.

At point 136 which represents 180° of mechanical rotation of armatures 101, 119, poles 115, 116 produce a voltage in the coil 121 of opposite direction and the flux established by field coils 111, 112 reverses, causing pole faces 107 and 110 to become south poles and pole faces 108 and 109 become north poles. Thus wires W3 are again crossing a field in which the flux extends from the pole face to the armature and a pulse of voltage is developed in the armature coil of the D.C. generator which corresponds to the curve between points 136, 137 of curve 132. Similarly a pulse between points 138 and 139 is developed at a later time in this cycle. This pulse corresponds to that developed between points 134 and 135. The average of the four pulses is a curve which has an average D.C. component represented by the dashed line 140.

As shown in FIGURE 1, two or more of the direct current generators may be coupled to supply the voltage and with proper phasing of the generators the combined output may be obtained as shown in FIGURE 11 and curve C.

I claim:

1. A direct current generator comprising: means, including a field alternator having a first armature and a first stator having a first coil thereon, for developing an alternating current signal of predetermined wave shape; means, including a generator having field producing windings coupled to and receiving said alternating current signal and having a movable second armature and a second stator carrying said windings, said second armature having a second coil thereon for developing a direct current signal therein; and means for maintaining a constant ratio of angular rotation between said first and second armatures.

2. A direct current generator comprising: a source of alternating current of predetermined wave shape and, including a movable armature and a stator having a first coil thereon; frequency means, including a second stator, a second movable armature having a second coil thereon for developing a direct current signal, and a field producing winding mounted on said stator and coupled to said source for producing direct current signals in said second coil; and means for maintaining a constant phase relationship between said source and said armature.

3. A direct current generator comprising: means, including a field alternator having a first armature and a first stator, for developing an alternating current signal of predetermined wave shape; means, including a movable second armature, a second stator, and a field producing winding mounted on said second stator and coupled to receive said alternating current signal; a coil mounted on said second armature for developing a direct current signal; and means for maintaining a constant ratio of angular velocity between said first and second armatures.

4. A direct current generator comprising: an alternator including a first armature having a pair of permanent magnets mounted thereon and including a first stator having a coil mounted thereon, rotation of said magnets producing an alternating current of predetermined wave shape and frequency in said coil; a generator including, a second stator having field windings coupled to receive said alternating current, a pair of pole pieces adjacent each winding, and a movable second armature having a load coil mounted thereon, said load coil moving consecutively past one of said pole pieces for developing a current in said load coils; and means for maintaining a fixed rotational movement between said first and second armatures.

5. A direct current generator comprising: an alternator including a first stator having a field producing coil mounted thereon and a first armature rotatably mounted adjacent said stator and having a pair of magnets of opposite type mounted thereon for producing an alternating current signal of predetermined wave shape and frequency; a second stator having a plurality of pole faces and a field producing winding mounted thereon and coupled to said field producing coil; a second armature having a second coil mounted thereon and rotatable past said pole faces for producing a direct current voltage; and means for rotating said first and second armatures in a predetermined relationship.

6. A motor generator set for producing direct current voltage comprising: a prime mover; an alternating current generator having a first stator with a first coil thereon, and a first rotor for producing an alternating current potential in said coil; a direct current generator having a second stator and a second rotor; field windings on said second stator coupled to receive said alternating current potential from said alternating current generator; a coil on said second rotor for developing a direct current signal therein; and means coupling said prime mover, first rotor and second rotor for driving said rotors in a predetermined rotational relationship.

7. A motor generator set for producing direct current voltages comprising: a prime mover; an alternating current generator having a first stator with a first coil thereon, and a first rotor for producing an alternating current potential in said coil; a direct current generator having a second stator and a second rotor for producing a direct current potential; field windings on said second stator coupled to said alternating current generator for receiving said alternating current potential; a coil on said second rotor for developing a direct current signal therein; said first rotor having a predetermined shape for producing an alternating current potential having first and second magnitudes; and means coupling said prime mover to said rotors for driving said rotors at a constant rotational relationship.

References Cited by the Examiner

UNITED STATES PATENTS

| 1,492,972 | 5/1924 | Engler | 310—177 |
| 2,266,607 | 12/1941 | Kaufmann | 322—61 |

LLOYD McCOLLUM, *Primary Examiner.*